United States Patent [19]

Avramidis et al.

[11] 4,186,617
[45] Feb. 5, 1980

[54] ROCKER JOINT ROLLER CHAIN

[75] Inventors: Stellios A. Avramidis, Mooresville; Frederic L. Jones, Indianapolis, both of Ind.

[73] Assignee: FMC Corporation, San Jose, Calif.

[21] Appl. No.: 893,919

[22] Filed: Apr. 6, 1978

[51] Int. Cl.² ............... F16G 13/06; F16G 15/12
[52] U.S. Cl. .................. 74/245 S; 74/250 S; 74/251 S; 74/253 S
[58] Field of Search ......... 74/245 R, 245 C, 245 S, 74/250 R, 250 S, 250 C, 251 R, 251 C, 251 S, 253 R, 253 S, 257; 198/850; 59/DIG. 1

[56] References Cited

U.S. PATENT DOCUMENTS

| | | | |
|---|---|---|---|
| 507,153 | 10/1893 | Morse | 74/253 R |
| 562,364 | 6/1896 | Appleby | 74/255 R |
| 583,150 | 5/1897 | Morse | 74/253 R |
| 583,151 | 5/1897 | Morse | 74/253 R |
| 663,352 | 12/1900 | Morse | 74/253 R |
| 663,353 | 12/1900 | Morse | 74/253 R |
| 866,980 | 9/1907 | Taylor | 74/255 R |
| 953,427 | 3/1910 | Morse | 74/253 R |
| 953,428 | 3/1910 | Morse | 74/255 R |
| 979,151 | 12/1910 | Gits | 74/236 |
| 993,969 | 5/1911 | Dodge | 74/251 R |
| 1,105,288 | 7/1914 | Morse | 74/255 R |
| 1,126,254 | 1/1915 | Morse | 74/253 R |
| 1,377,268 | 5/1921 | Nelson | 74/254 |
| 1,404,740 | 1/1922 | Curtis | 74/255 R |
| 1,419,891 | 6/1922 | Oakes | 74/255 R |
| 1,534,494 | 4/1925 | Belcher | 74/253 R |
| 1,558,719 | 10/1925 | Sturtevant | 74/253 R |
| 1,563,065 | 11/1925 | Belcher | 74/253 R |
| 1,634,334 | 7/1927 | Morse | 74/253 R |
| 1,638,388 | 8/1927 | Belcher | 74/253 S |
| 1,644,656 | 10/1927 | Belcher | 74/253 R |
| 1,656,610 | 1/1928 | Smyth | 74/251 R |
| 1,691,871 | 11/1928 | Reeves | 74/245 S |
| 1,692,799 | 11/1928 | Sturtevant | 74/253 S |
| 1,743,157 | 1/1930 | Morse | 74/251 R |
| 1,743,500 | 1/1930 | Sturtevant | 74/253 S |
| 1,863,606 | 6/1932 | Perry | 74/255 R |
| 1,887,137 | 11/1932 | Morse | 74/253 S |
| 2,248,189 | 7/1941 | Pierce | 74/250 S |
| 2,284,565 | 5/1942 | Emmons | 74/251 R |
| 2,602,344 | 7/1952 | Bremer | 74/250 S |
| 3,043,154 | 7/1962 | Karig et al. | 74/250 R |
| 3,213,699 | 10/1965 | Terepin | 74/251 R |
| 3,540,302 | 11/1970 | Bendall | 74/250 R |
| 3,595,099 | 7/1971 | Ivashkov et al. | 74/251 R |
| 3,742,776 | 7/1973 | Avramidis | 74/251 S |
| 3,880,014 | 4/1975 | Bendall | 74/245 R |
| 3,895,137 | 7/1975 | Avramidis et al. | 427/295 |
| 4,130,026 | 12/1978 | Jeffrey | 74/245 S |

FOREIGN PATENT DOCUMENTS 1135721 8/1962 Fed. Rep. of Germany ...... 59/DIG. 1
235616 6/1925 United Kingdom ................. 74/245 R Primary Examiner—Samuel Scott
Assistant Examiner—Randall L. Green
Attorney, Agent, or Firm—J. F. Verhoeven

[57] ABSTRACT

A hybrid type chain having a low wear pivot joint between inner and outer links has been provided. Both the inner and outer links of the chain are pin links with the pins tightly received, respectively, in the sidebars of the links. Each pin of an inner link is engaged with the adjacent pin of the adjacent outer link in linking engagement to form a pivot joint. All pins have convex, arcuate faces for rocking engagement between the pins at the pivot joint between links.

1 Claim, 14 Drawing Figures

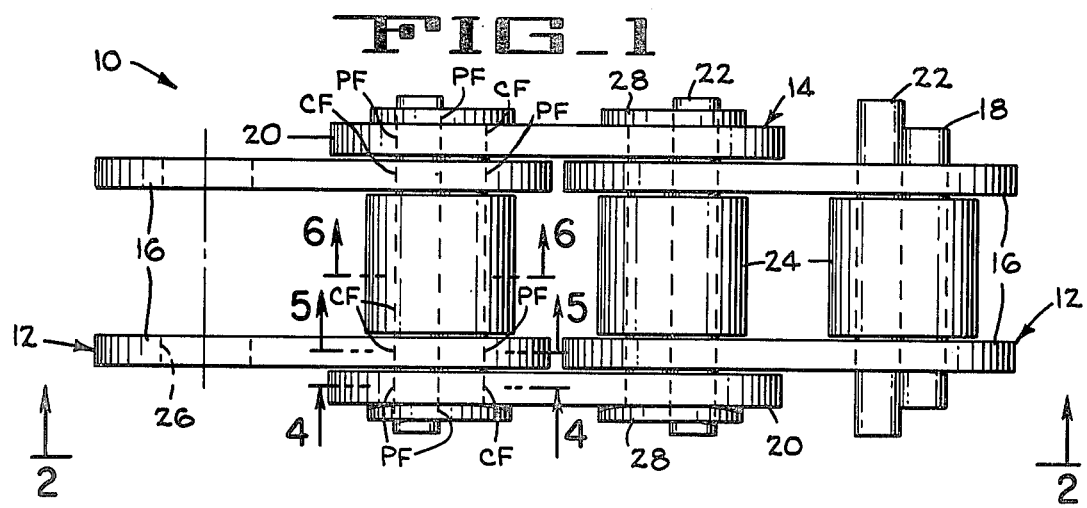
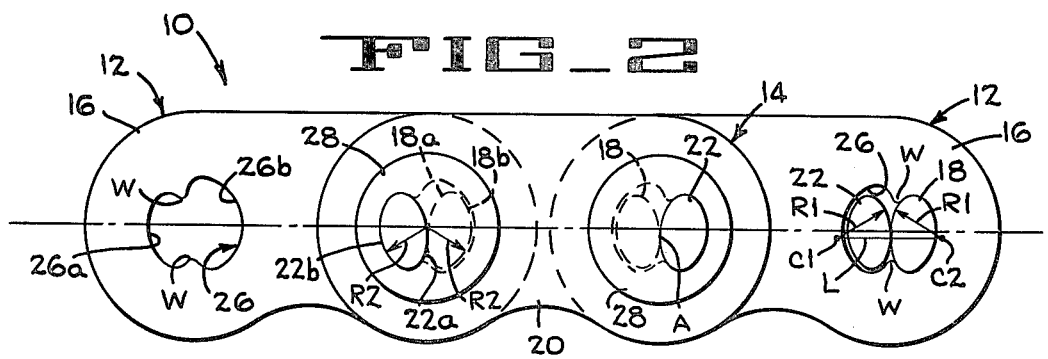
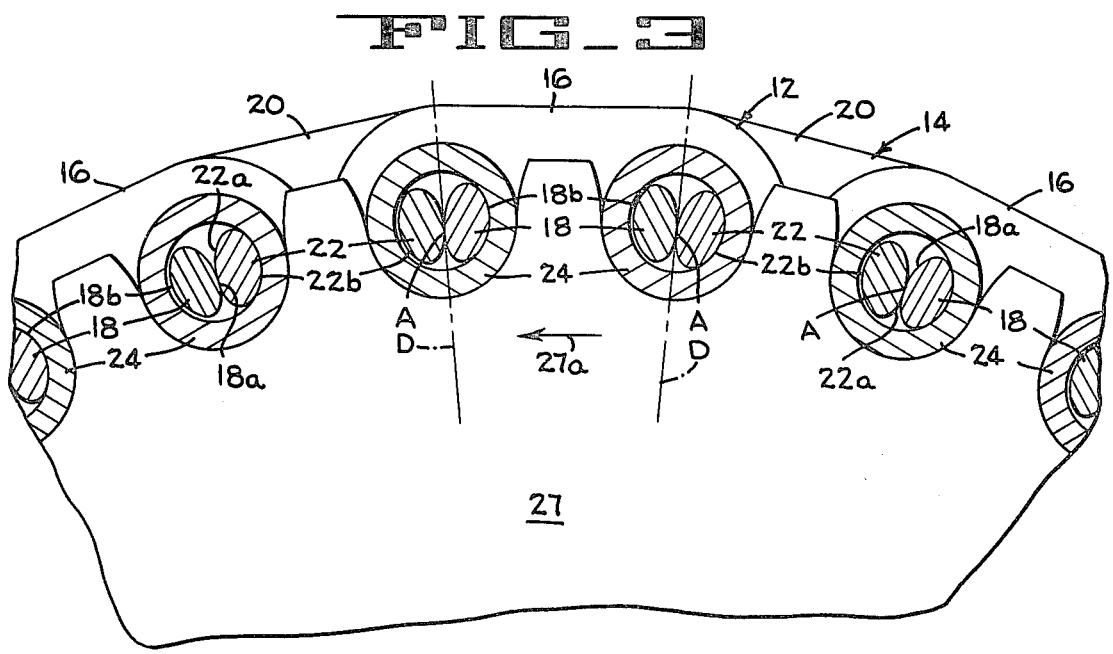

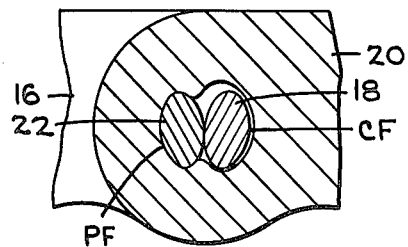
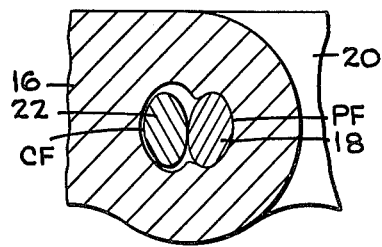
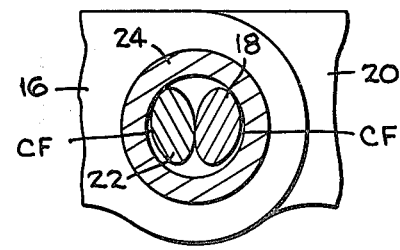
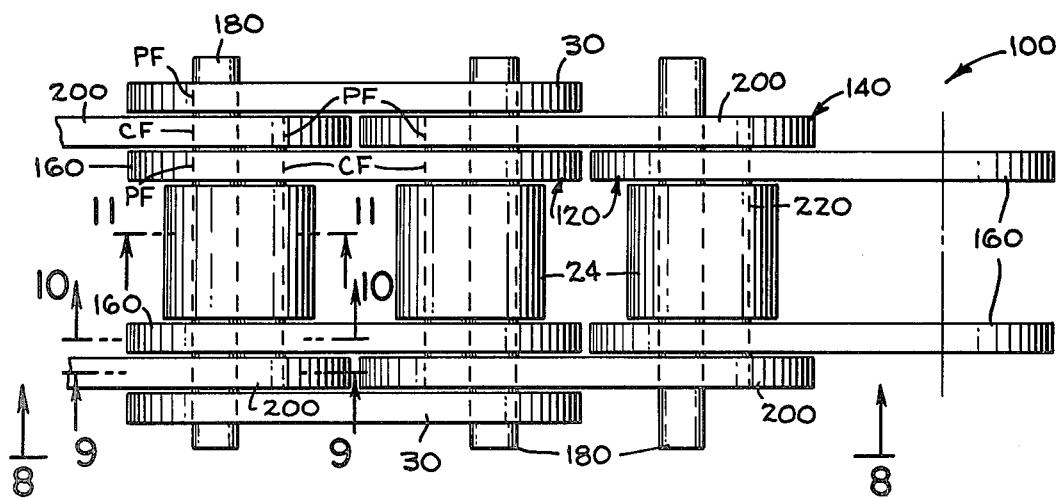

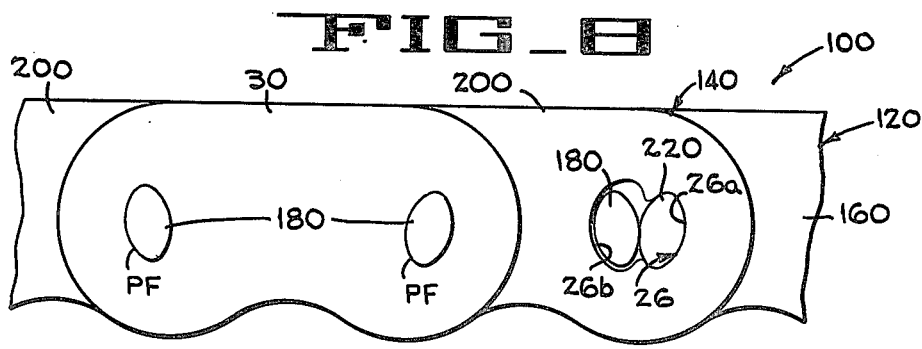
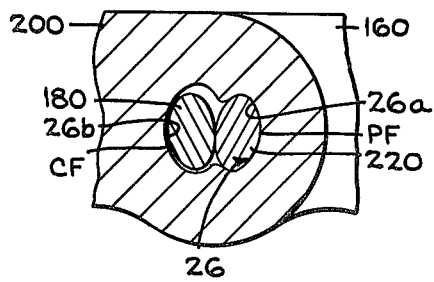
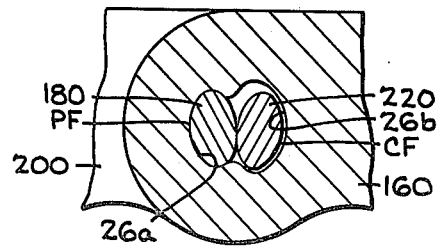
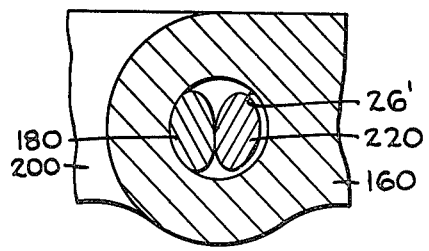
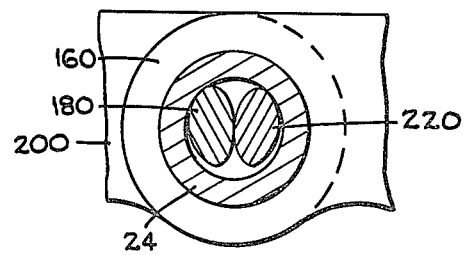

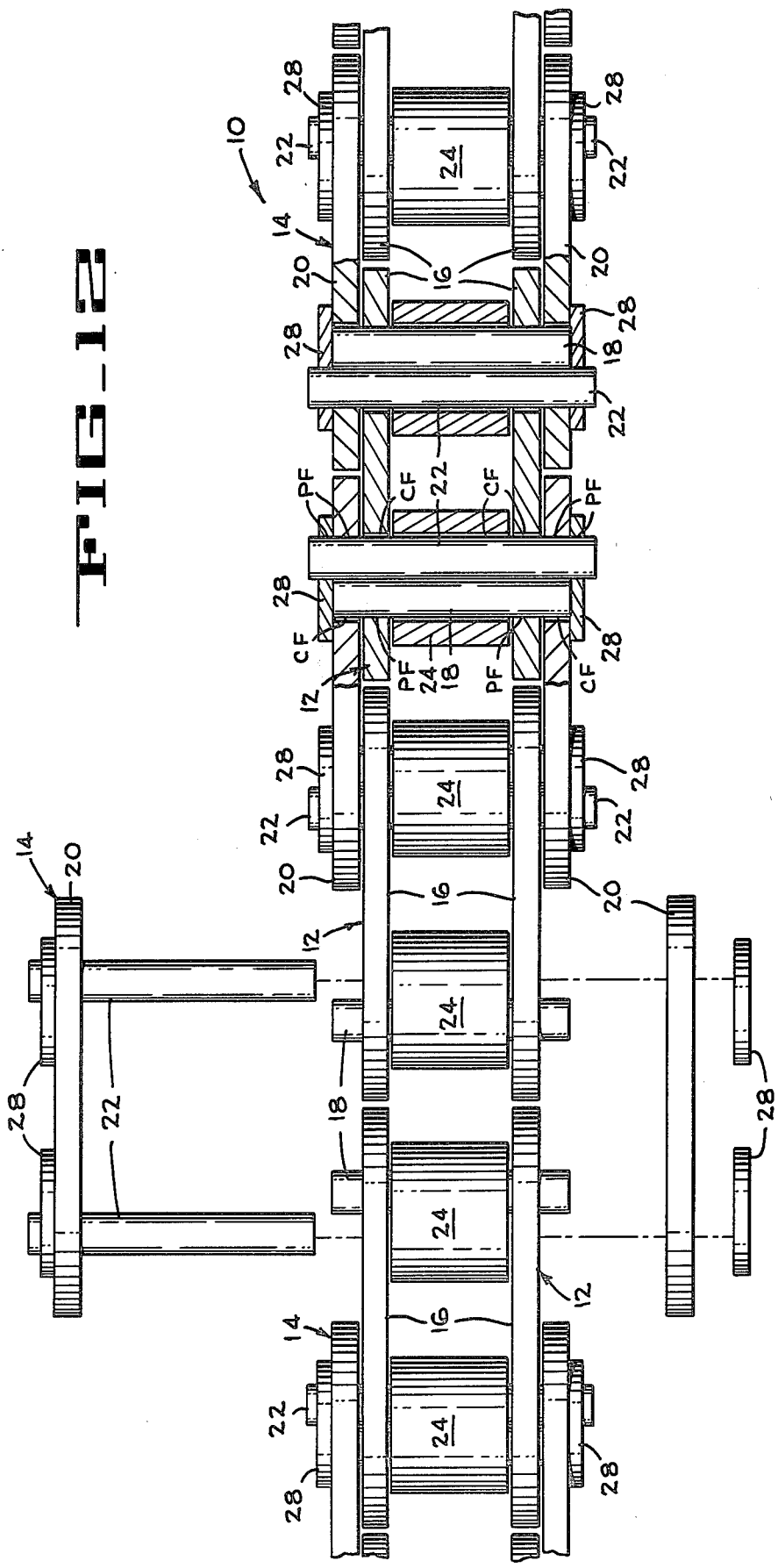

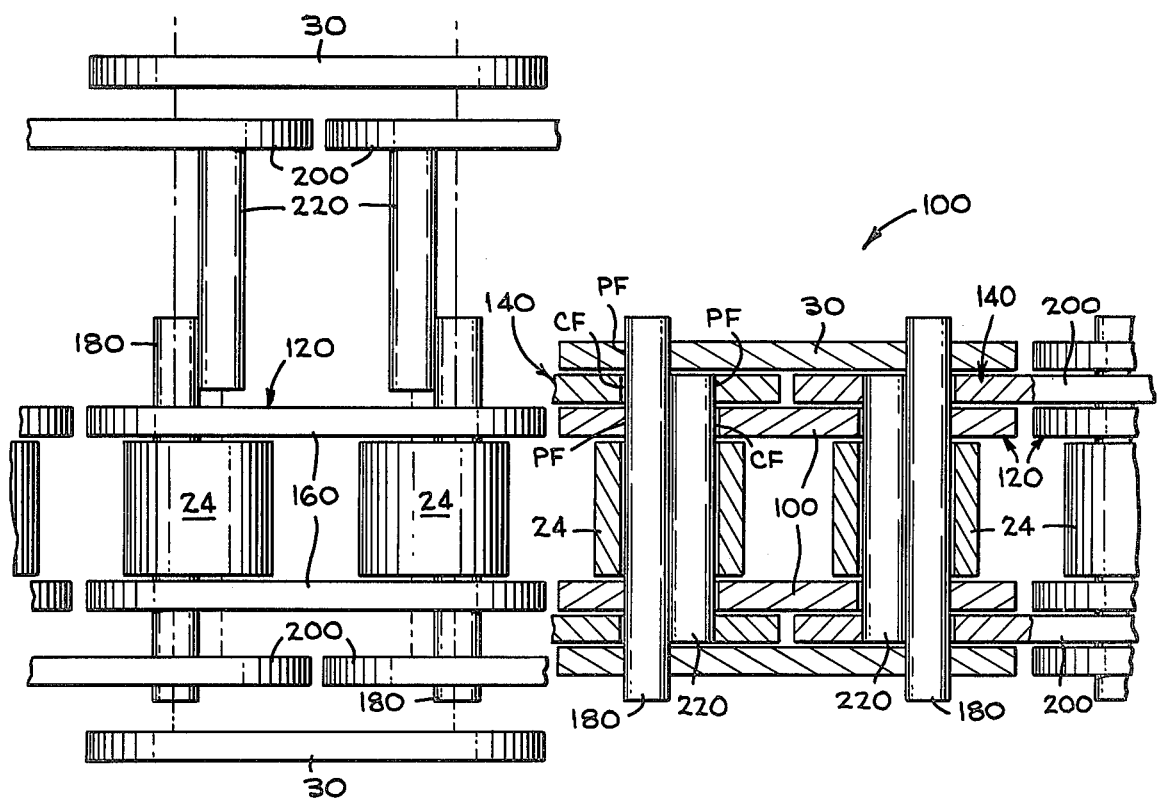
FIG_13

ROCKER JOINT ROLLER CHAIN

BACKGROUND OF THE INVENTION

1. Field of the Invention

The present invention relates to a roller chain with low wear pivot connections.

2. Description of the Prior Art

Two types of chain in current use are the silent chain and the roller chain. A silent chain (as shown, for example, in U.S. Pat. No. 3,742,776) consists of links having teeth which engage with the teeth of a sprocket on which the chain is received. The links of a silent chain consist of a first group of links mounted on two pins, one at each end of the first group, and a second group of links mounted on two pins, one at each end of the second group. A first and second pin are received in rocking engagement at a pivot joint between the groups in aligned openings in both groups of links to pivotally connect the first group of links to the second group of links. The two groups of links are intermeshed at the pivot joint with the first group of links extending from the pivot joint in one direction and the second group of links extending from the pivot joint in the opposite direction. The rocking engagement between the two groups of links produces a low incidence of wear at the pivot joint between the two groups of links. The chain is made up of alternate first and second groups of links with a pivot joint between adjacent groups of links.

A typical roller chain (as shown, for example, in the U.S. Pat. No. 3,895,137) consists of alternate bushing links and pin links. The bushing links (which define inner links) consist of spaced sidebars with bushings tightly received in openings at each end of sidebars. The pin links (which define outer links) consist of spaced sidebars with pins tightly received in openings at each end of the sidebars. The pins are rotatably received in the bushings to connect the pin links pivotally to the bushing links in alternate arrangement. Rollers are provided on the bushings, and when the roller chain is received on a sprocket, the teeth of the sprocket are received between the laterally spaced sidebars and the longitudinally spaced rollers.

Efforts have heretofore been made to provide in a roller chain, the smooth, low wear connecting joint of the silent chain. These efforts have produced hybrid chains, which can be referred to as dual pin roller chains, such as those shown in U.S. Pat. Nos. 663,352; 663,353; 866,980; 3,540,302; and 3,595,099. By way of example, the dual pin roller chain of U.S. Pat. No. 3,595,099 has, at each pivot joint, a pair of complementary pins, one of which has a concave contact surface and the other of which has a convex contact surface. As the adjacent links pivot with respect to each other, one of said contact surfaces slides on the other of said contact surfaces to provide the required articulation of the chain.

In the U.S. Pat. No. 3,540,302, there is shown a dual pin roller chain in which sliding friction at the pin contact faces has been avoided. However, since the pins of this patent are mounted loosely in the side bars, rubbing friction is inevitable during articulation of the chain.

SUMMARY OF THE INVENTION

In the present invention, there is provided a chain combining many of the desirable features of both a roller chain and a silent chain, in which rubbing friction has been avoided. Specifically, there is provided a chain having alternate inner links and outer links as does a conventional roller chain. However, in the chain of the present invention, both the inner links and the outer links are pin links. The pivotal joint between an inner link and an outer link consists of two contacting pins, each of which is tightly received in the pair of sidebars of one of the pin links to define a rigid connection and to prevent any rubbing between the pins and the sidebars. The pins each have convex contact surfaces for a rocking engagement with the other pin at the joint, and no sliding occurs between the pins. Retaining members are tightly received on one pin of each pair (to define a rigid connection therewith) at the joints, outboard of the sidebars, to insure retention of the elements of the chain in assembled relationship, to block contaminants, and to retain lubricant in the joints.

It is therefore one object of the present invention to provide a roller chain with low wear link-connecting joints.

It is another object of the present invention to provide a roller chain with articulated joints free of all sliding or rubbing.

It is yet another object of the present invention to provide a roller chain which, although held in tightly assembled relationship, has smooth and frictionless articulation.

BRIEF DESCRIPTION OF THE DRAWINGS

FIG. 1 is a plan view of a chain constructed in accordance with the present invention.

FIG. 2 is a view taken on the line 2—2 of FIG. 1.

FIG. 3 is a view in section of the chain of the present invention mounted on a sprocket.

FIG. 4 is a view taken on the line 4—4 of FIG. 1.

FIG. 5 is a view taken on the line 5—5 of FIG. 1.

FIG. 6 is a view taken on the line 6—6 of FIG. 1.

FIG. 7 is a plan view of a modified form of the present invention.

FIG. 8 is a view taken on the line 8—8 of FIG. 7.

FIG. 9 is a view taken on the line 9—9 of FIG. 7.

FIG. 10 is a view taken on the line 10—10 of FIG. 7.

FIG. 10A is a view similar to FIG. 10 except showing a modified sidebar of the inner link.

FIG. 11 is a view taken on the line 11—11 of FIG. 7.

FIG. 12 is a plan view, shown partly in cross-section and partly in exploded form, of the chain of FIG. 1.

FIG. 13 is a plan view, shown partly in cross-section and partly in exploded form, of the chain of FIG. 7.

DESCRIPTION OF THE PREFERRED EMBODIMENTS

There is shown in FIG. 1 a chain 10 constructed in accordance with the present invention. The chain is made up of a plurality of inner links 12 and outer links 14. Each inner link has a pair of longitudinal, laterally spaced sidebars 16 and a pair of transverse, longitudinally spaced pin segments 18. Each outer link has a pair of longitudinal, laterally spaced sidebars 20 and a pair of transverse, longitudinally spaced pin segments 22.

Every other link is an inner link 12 and alternate links are outer links 14, which are wider than the inner links and overlap the inner links. The sidebars of the outer links straddle and overlap the sidebars of the inner links. The pin segments 18 and 22 of the inner and outer links, respectively, are engaged in interlinking relationship to define a pivot joint for the links. Rollers 24 are loosely received on the two pin segments at each pivot joint.

The pin segments 18 and 22 may be identical in cross-section, although segment 22 is longer, for reasons to be described hereinafter, than segment 18. Each segment has an inner face 18a, 22a which engages, on a transverse axis A (FIG. 2) the inner face 22a, 18a of the pin in contact therewith. Each segment has an outer face 18b, 22b opposite the inner face thereof. The inner faces 18a, 22a are convex arcs (which may be circular) and the outer faces 18b, 22b are convex arcs (which may also be circular). The radii R1, R2 of the inner and outer faces may, but need not be, identical. The tops and bottoms of the pins (as viewed in FIG. 2) are rounded to meld into the inner and outer faces.

Each sidebar has an opening 26 of generally circular configuration with a slightly pinched waist W to divide the opening into two portions 26a and 26b. The smaller portion 26a is of a size slightly smaller than pin segment 18 or 22, while the larger portion 26b is of a size for pin segment 18 or 22 to extend through with clearance. On each link, the opening at one end of the link is reversed from the opening at the other end of the link and, in each instance, the smaller portion 26a is toward the end of the link while the larger portion 26b is toward the center of the link.

The shorter pin segment 18 is secured, at each end, by press fit (that is, by an interference fit) into the smaller portion 26a of both of the openings in each inner sidebar 16, to form a rigid connection between the pin segments and the sidebars, and to render the inner pin link 12 rigid. The longer pin segment 22 is secured, at each end, by press fit into the smaller portion 26a of both of the openings in each outer sidebar 20, to form a rigid connection between the pin segments and the sidebars, and to render the outer pin link 14 rigid. It will be noted (FIG. 5) that the longer pin segment 22 passes through the larger portion 26b of the opening in the inner sidebars 16 with clearance (but in contact with the other pin segment 18 when the chain is under tension). The shorter pin segment 18 is received in the larger portion 26b of the opening in the outer sidebars 20 (FIG. 4) with clearance (but in contact with the other pin segment 22 when the chain is under tension). Press fits are indicated on the drawings by the symbol PF; clearance fits are indicated by CF.

It should be noted, as indicated in FIG. 12, that at least one outer sidebar 20 (the one shown in exploded position below the chain) is press fit onto pin segments 22 after the segments 22 have been inserted behind the pin segments 18 of the inner links 12, to assemble the inner links 12 and the outer links 14 in coupled, or linking, relationship.

As shown in FIG. 3, when the chain is received on a sprocket 27 (which is moving in the direction of arrow 27a), and is placed under tension, the faces 18a, 22a are in contact. The contact extends along the axis A the full length of the shorter pin 18. The axis of contact A lies in plane of contact D which is the plane perpendicular to a line L (FIG. 2) extending between the centers C1, C2 of the circular arcs of faces 18a, 22a. The angles between adjacent planes D (which are perpendicular to the direction of motion of the respective joints) define the extent of articulation between the joints. When the chain is moving in a straight line, without articulation, the planes D are parallel. The axis of contact A remains in plane D in any relative position of the links due to articulation of the chain but moves up and down in the plane D as the relative angle between the links changes.

Thus, there are two characteristics of the pivot connection between the links which should be noted: (1) the axis of contact A between the convex arcuate contact faces of the pins is determined by the angle between the inner and outer links, and this line moves up and down on the faces as the chain is articulated in one direction or the other; (2) at each sidebar, one pin segment is securely fixed therein while the other pin segment is received therein with clearance (except for the contact with the other pin segment). Therefore, since the engagement of the pin segments constitutes rocking only (about a moving axis), and since one pin segment is secured in each sidebar while the other pin segment does not contact that sidebar, there is no rubbing or frictional wear between either pin segment and the sidebars. Instead, a smooth, quiet, low-wear articulation occurs at each joint. It should be noted that the loose fit of the rollers on the pin segments (as shown, for example, in FIG. 6), permits a free rocking of the pin segments on each other without binding from the roller.

It will be noted that the tight fit of the pin segments 18 and 22 in the inner sidebars 16 and the outer sidebars 20, respectively, will hold the chain in assembled relationship. However, to guard against disassembly from abnormal use and/or an inadvertent blow to the chain, and to prevent contaminants from entering the chain joint, precautionary measures have been taken. In the embodiment of the invention shown in FIGS. 1 to 6, inclusive, a retaining member in the form of a washer 28 is press fit on the ends of the longer pins 22 (outboard of the sidebars 20 of the outer links 14). The washers 28 are not centered with respect to pins 22 but, instead, are mounted thereon in eccentric relation to overlap the ends of the shorter pins 18, which terminate at the outer face of the sidebars 20 of the outer links 14. In this manner, the washer 28 serves to help maintain the pins in their respective links to hold the links in assembled relationship. Although both pin segments at each joint are retained in assembled relationship by a single washer at each end of the longer pin segment, the free rocking movement of the pin segments (and hence free articulation of the chain links) is not hindered by the retaining member.

In the chain 100 of FIG. 7, every other link is an inner link 120, and alternate links are outer links 140. In many respects, the chain 100 is similar to, or identical with, the chain 10 of FIG. 1, but, in other respects the chains differ because of the use of retaining members in the form of bars 30, instead of the retaining washers 28 used on the chain 10.

The inner links 120 each has lateral spaced sidebars 160 and a pin segment 180 tightly received, as by press fit, in both sidebars (to form a rigid connection) at each end of the sidebars, thereby forming a rigid inner link. The outer links 140 each has laterally spaced sidebars 200 and a pin segment 220 tightly received, as by press fit, in both sidebars (to form a rigid connection) at each end of the sidebars, thereby forming a rigid outer link. As in FIG. 1, the press fits are designated PF and clearance fits by CF.

As shown in FIG. 13, one sidebar 200 (the lower one) of the outer link 140 cannot be rigidly connected to the pins 220 until after the pins have been inserted through the sidebars of the inner links 120, and through the rollers 24. When this is done the sidebar 200 of the outer link must be placed over the extending pin segment 180 of the inner link, which is received with clearance in the portion 26b of the opening 26 in the sidebar 200.

The bar retainer 30 is received tightly over both of the pins 180 of the inner links 120 (see FIG. 8) to retain the chain in assembled relation in the event of an unusual condition, such as a blow or abnormal wear. The bar retainer 30 also serves to prevent contaminants from entering chain joints and to hold lubricant in the joints. The retainer bar 30 overlaps the ends of pins 220 of the outer links to effectively hold these pins from lateral displacement. It should be noted that the retainer bar 30 serves to reinforce the sidebars 160 of the inner links, and provides for additional pin shear strength.

As shown in FIGS. 9 and 10, each pin segment passes through the opening 26 in every sidebar. In each sidebar, one pin segment is tightly held in one portion 26a of the opening while the other pin segment passes through the portion 26b of the opening with clearance. The pin segments passing through the sidebar 200 of the outer link is shown in FIG. 9, and the pin segments passing through the sidebar 160 of the inner link is shown in FIG. 10.

An alternative opening 26' in the sidebars 160 of the inner links is shown in FIG. 10A. This opening is circular, and both pin segments 180 and 220 pass through this opening. It will be noted that retaining bar 30 and sidebar 160 both receive the same pin segments 180. Since the pin segments 180 are tightly received in the retainer bars 30 (see FIG. 8), the pin segments 180 will be held tightly against the edge of openings 26' in sidebars 160 because the distance M between the outer edges of the openings in bar 30 (FIG. 8) is equal to the distance between the outer edges of openings 26' in each sidebar 160 (see FIG. 10A). Thus, the pin segments 180 are constrained so that rubbing or sliding between the pin and sidebar is prevented.

Throughout the specification I have indicated that certain pin segments are received tightly in certain sidebars to form a rigid inner or outer link. Although I prefer to use a press fit to achieve this tight fit, other means such as welding can be used.

Although the best mode contemplated for carrying out the present invention has been herein shown and described, it will be apparent that modification and variation may be made without departing from what is regarded to be the subject matter of the invention.

What is claimed is:

1. In an articulated chain comprising a plurality of first links and a plurality of second links, each of said first links and each of said second links having a pair of spaced apart longitudinal sidebars, a pair of transverse pin segments comprising a first pin segment and a second pin segment extending between the opposite ends, respectively, of said sidebars, said first links wider than said second links for an overlapping relationship between said links when said pins are in coupled pivotal engagement, the improvement wherein said sidebars of said second links are spaced apart in the lateral direction to receive the teeth of a sprocket therebetween and said pairs of pin segments are spaced apart longitudinally to receive said teeth therebetween, and wherein each end of each sidebar of said first links has an opening of generally circular configuration with a slightly pinched waist to divide the opening into two portions of unequal size, each end of each first pin segment tightly received in said smaller portion of said opening in each end of each sidebar of said first links to render said first links rigid, each end of each sidebar of said second links having an opening of generally circular configuration with a slightly pinched waist to divide the opening into two portions of unequal size, each end of each second pin segment tightly received in said smaller portion of said opening in each end of each sidebar of said second links to render said second links rigid, said first pin segments received in the larger portion of said openings in the sidebars of said second links with clearance and said second pin segments received in the larger portion of said openings in the sidebars of said first links with clearance, said first pin segments received in said sidebars of said second links in coupled relationship with the second pin segments and said second pin segments received in said sidebars of said first links in coupled relationship with the first pin segments to couple said links together, a convex surface on the inner and outer faces of each of said first pin segments and a convex surface on the inner and outer faces of each of said second pin segments for rocking engagement at the joint between each link and adjacent links.

* * * * *